Figure 1:
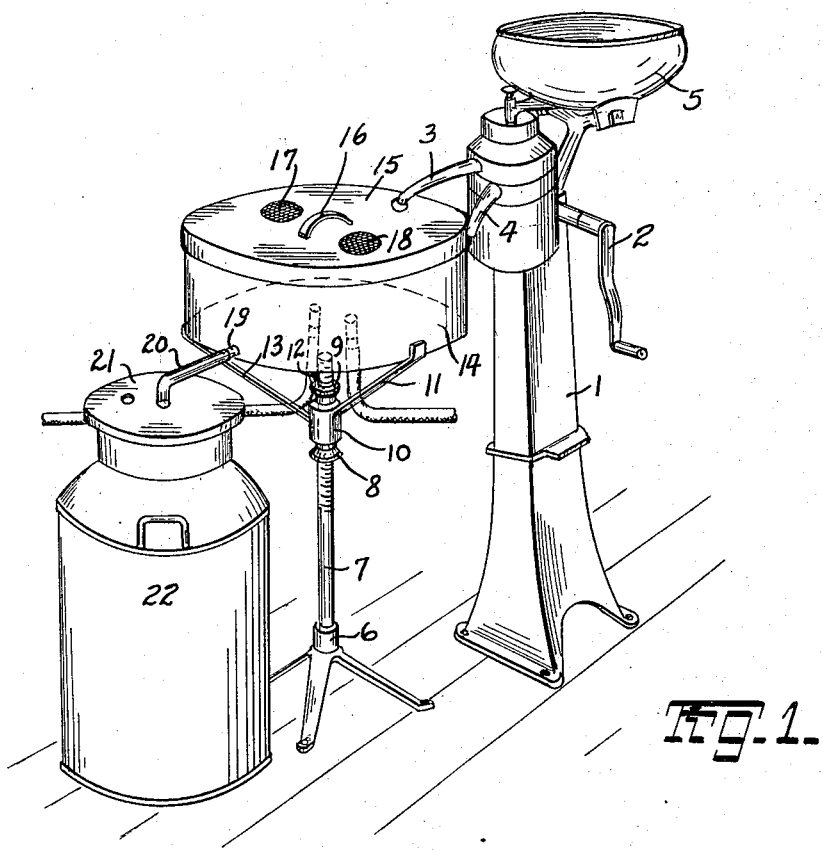

J. N. GILMAN.
COOLER FOR LIQUIDS.
APPLICATION FILED APR. 26, 1915.

1,204,561.

Patented Nov. 14, 1916.
2 SHEETS—SHEET 1.

WITNESSES:
Elbert R Brower
A. H. Kephart

INVENTOR.
JAMES N. GILMAN.
BY
Carlos P. Griffin
ATTORNEY.

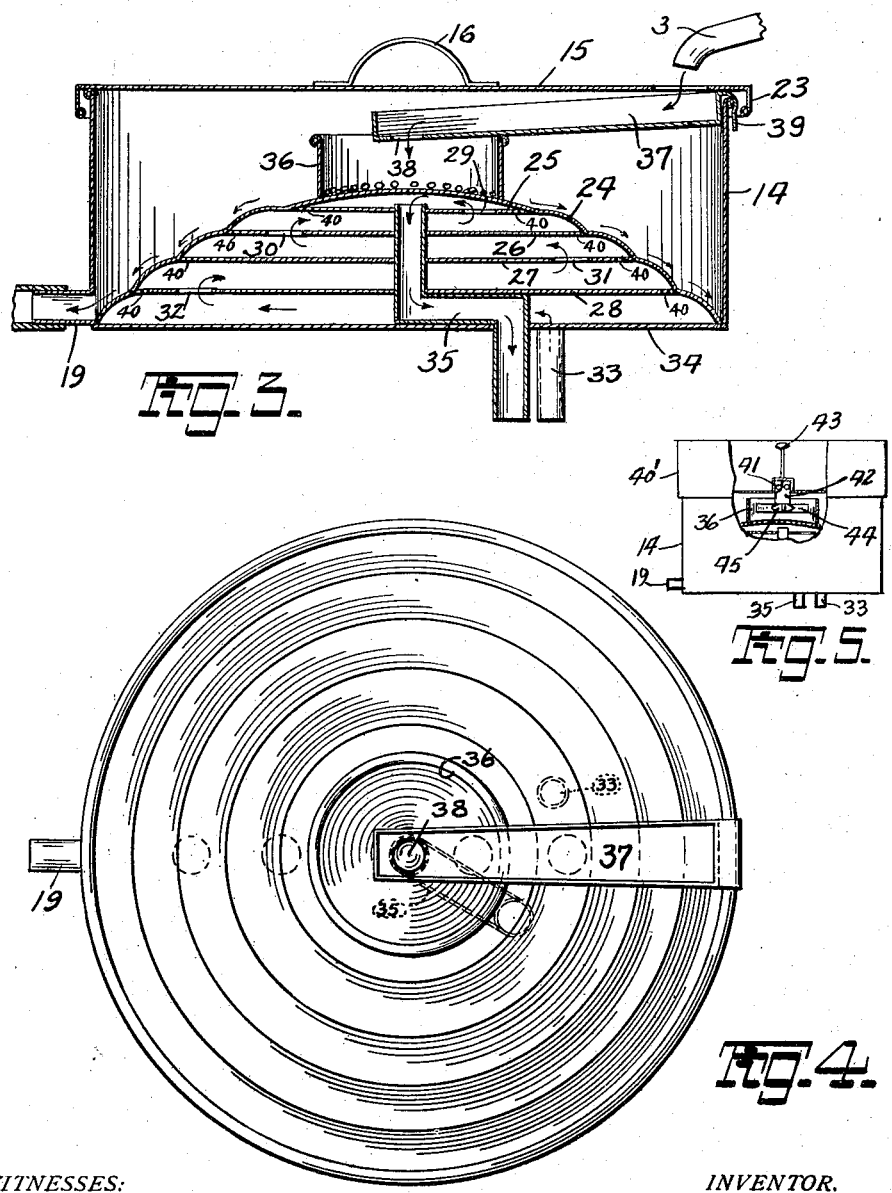

UNITED STATES PATENT OFFICE.

JAMES N. GILMAN, OF BERKELEY, CALIFORNIA.

COOLER FOR LIQUIDS.

1,204,561.　　　　　Specification of Letters Patent.　　Patented Nov. 14, 1916.

Application filed April 26, 1915.　Serial No. 23,973.

*To all whom it may concern:*

Be it known that I, JAMES N. GILMAN, a citizen of the United States, residing at Berkeley, in the county of Alameda, State of California, have invented a new and useful Cooler for Liquids, of which the following is a specification in such full and clear terms as will enable those skilled in the art to construct and use the same.

This invention relates to a cream cooler used in connection with a cream separator, the object being to provide in as shallow a space as possible the maximum cooling area for the cream delivered thereon.

It will be understood by those skilled in the art that in the operation of milk separators in the ordinary dairy practically all of the apparatus must be set up on a single floor and this necessitates having the milk supply receptacle at a convenient height for the milker to pour the milk thereinto. The milk must then run into the separator chamber and then through the cooler and into the shipping receptacle therefor. It becomes necessary, therefore, to provide a cooler which can be used in connection with the standard separator and standard milk or cream shipping can without substantial change.

An embodiment of the invention is shown in the drawing in which the same reference numeral is applied to the same portion throughout, but I am aware that there are many modifications thereof.

Figure 2:
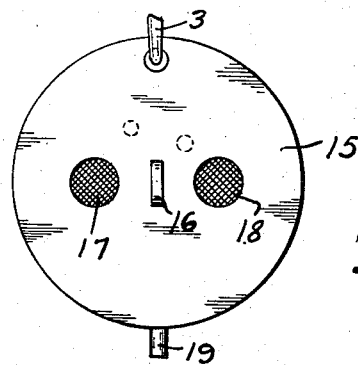

Figure 1 illustrates the cream cooler in connection with a separator and receptacle for the cream in perspective view, Fig. 2 is a plan view of the cooler showing the cream outlet spout from the separator and cream outlet spout for the cooler. Fig. 3 is a vertical sectional view through the cooler, Fig. 4 is a plan view thereof with the cover removed, and Fig. 5 is a side elevation partly in section of a milk receiving receptacle used in conjunction with the cooler where buckets of milk are to be poured thereinto instead of the cooler receiving a small stream as is the case when the cooler is used in connection with the milk separator as is illustrated in Fig. 1.

The numeral 1 indicates the pedestal of the cream separator, 2 the hand crank, 3 the cream spout, 4 the skimmed milk spout and 5 the milk receptacle. At the side the cream cooler has a suitable base 6 having a pedestal extending upwardly therefrom, the upper end of said pedestal being threaded to receive two nuts 8 and 9 to provide for the adjustment of the position of the milk cooler supporting boss 10.

The boss 10 is provided with three upwardly inclined legs 11, 12 and 13 which support the cream cooler 14. The cooler is provided with a top 15 having a handle 16 and screened openings 17 and 18 to allow the escape of heat and gases from the cooler. At the side opposite from the position of the milk separator a spout 19 extends outwardly from the cooler. Over the end of the outlet spout 19 is placed a spout 20 having its outer end turned down to deliver the cream through the top 21 of the cream receptacle 22.

The cream cooler top 15 has a downwardly extending flange 23 at its outer edge which extends down over the top of the cooler. The interior construction of the cooler is as follows: A sheet of tin or other suitable material is pressed up to provide a plurality of curved surfaces 24, the object being to increase the cooling area over what it would be if the material of which the curved surfaces are made was simply in the form of a cone. The curved plate thus formed has a plurality of flat plates 25, 26, 27 and 28 therein and connected therewith at different levels, each of said plates having a hole as indicated at 29, 30, 31 and 32 to allow the cold water going from the pipe 33 to pass through the spaces formed by the plate 28 and the bottom 34 through to the top of the cooler above the plate 25 and then into the discharge pipe 35.

At the upper part of the plate 24 there is a circular partition 36 which is provided with a plurality of small openings at its base to compel the cream to trickle over the entire area of the plate 24 thereby effectively cooling it and bringing it into contact with the largest possible area of cooling surface.

Resting on one edge of the cooler is a trough 37 having an opening 38 in the center of the cooler and having a hook 39 passed over the edge of the cooler to hold the trough in position.

In operation the cooler is set up along side of the separator and adjusted to a proper height so that the cream spout will just fit into the inlet opening in the cooler over, whereupon the separator may be started and the cream will be forced into the spout 37 and will trickle from the openings 36 down over the plate 24 and ultimately out through the openings 19 into the cream receptacle. Small holes 40 are provided at the periphery of each of the horizontal partitions.

It is to be observed that the construction is such that all of the parts which come in contact with the cream are separable one from another so that the cooler may be thoroughly and easily kept cleaned.

In Fig. 5 the cooler 14 is provided with a deep cover 40', which cover is capable of holding several buckets of milk while at the center thereof it has a short tube 41 in which is a rotary sleeve 42 having a handle 43 to regulate the discharge of milk therethrough. As the milk passes out of the tube 41 it is discharged into the distributer 36.

A float 45 having centering wings 44 is placed in the distributer and if the stream of milk from the pipe 41 is larger than the openings around the edge of the distributer will discharge the float rises and prevents the escape of milk from the pipe 41 until the holes at the outside of the distributer can handle the amount passing from the pipe 41.

It will be obvious that while the term "cooler" has been used to designate this device that it may equally well be used as a pasteurizer or heater by the mere application of hot water instead of cold, and such use is deemed to be within the scope of the invention, and the term "cooler" is to be generically considered.

Having thus described my invention what I claim as new and desire to secure by Letters Patent of the United States, is as follows:

1. A heat transfer apparatus for liquids comprising a receptacle having a corrugated raised bottom, a distributer at the top of said raised bottom, a discharge pipe for the receptacle, a plurality of horizontal partitions under the raised bottom and having openings therethrough to cause the circuitous travel of the liquid used for heating or cooling, a supply pipe and a discharge pipe connected with the chambers formed by said partitions, and a trough for delivering the liquid to be treated from the edge of the receptacle to the distributer.

2. A heat transfer apparatus for liquids comprising a flat bottomed receptacle having a discharge pipe on one side thereof, a corrugated false bottom within said receptacle, a distributer at the top of the false bottom adapted to deliver a liquid to all sides of said false bottom, a plurality of substantially horizontal partitions under said false bottom, said partitions having openings therethrough to cause the circuitous travel of the liquid used for heating or cooling, a water supply pipe and a water discharge pipe extending through the bottom of the receptacle and connecting with the chambers formed by said horizontal partitions, a supply trough adapted to deliver liquid from the edge of the receptacle to the distributer at the center of the coned bottom, and a suitable cover for the receptacle.

In testimony whereof I have hereunto set my hand this 17th day of April, A. D. 1915, in the presence of the two subscribed witnesses.

JAMES N. GILMAN.

Witnesses:
C. P. GRIFFIN,
JAMES MASON.

Copies of this patent may be obtained for five cents each, by addressing the "Commissioner of Patents, Washington, D. C."